(12) United States Patent
Ren et al.

(10) Patent No.: US 9,422,180 B2
(45) Date of Patent: Aug. 23, 2016

(54) METHOD OF TREATMENT OF COKE WASTEWATER

(76) Inventors: Hongqiang Ren, Nanjing (CN); Xiaolei Shi, Nanjing (CN); Lili Ding, Nanjing (CN); Ming Liu, Nanjing (CN); Xiaobing Hu, Nanjing (CN)

(\*) Notice: Subject to any disclaimer, the term of this patent is extended or adjusted under 35 U.S.C. 154(b) by 1097 days.

(21) Appl. No.: 13/454,111

(22) Filed: Apr. 24, 2012

(65) Prior Publication Data

US 2012/0205317 A1 Aug. 16, 2012

Related U.S. Application Data

(63) Continuation-in-part of application No. PCT/CN2010/079890, filed on Dec. 16, 2010.

(30) Foreign Application Priority Data

Feb. 11, 2010 (CN) .......................... 2010 1 0109182

(51) Int. Cl.
| | |
|---|---|
| *C02F 1/52* | (2006.01) |
| *C02F 9/00* | (2006.01) |
| *C02F 1/461* | (2006.01) |
| *C02F 1/467* | (2006.01) |
| *C02F 1/66* | (2006.01) |

(52) U.S. Cl.
CPC ................ *C02F 9/00* (2013.01); *C02F 1/4672* (2013.01); *C02F 1/46114* (2013.01); *C02F 1/5236* (2013.01); *C02F 1/66* (2013.01)

(58) Field of Classification Search
CPC ....................................................... C02F 9/00
See application file for complete search history.

(56) References Cited

U.S. PATENT DOCUMENTS

| | | | | |
|---|---|---|---|---|
| 4,388,195 A | * | 6/1983 | von Hagel .......... | B01D 21/0018 210/709 |
| 6,251,258 B1 | * | 6/2001 | Kojima .................. | A23J 1/002 205/702 |

OTHER PUBLICATIONS

Wang et al. ('Advanced Treatmentof Coal Tar Wastewater and Mechanism by Fluid Three-dimensional Electrode Reactor.' Journal of China Coal Society. vol. 35, No. 1, Jan. 31, 2010, p. 122.*
Zhang et al. ('Studies on the Preparation and Decolorization of Polysilicate Ferric Magnesium Flocculant.' Industrial Water Treatment. vol. 29, No. 8, Aug. 31, 2009.*
International Report on Patentability for CN2010/079890.*

\* cited by examiner

*Primary Examiner* — Peter Keyworth

(74) *Attorney, Agent, or Firm* — Matthias Scholl P.C.; Matthias Scholl

(57) ABSTRACT

A method for treatment of coke wastewater, including (1) introducing wastewater into a regulating reservoir into which an acid liquor is added until the pH value of the wastewater ranges between about 5.5 and about 6.5; (2) introducing the wastewater into a three-dimensional electrode treatment device for electrolysis treatment; and (3) introducing the wastewater into a coagulation reaction tank into which an alkali liquor is added until the pH value of the wastewater ranges between 8 and 10, and as a coagulant polysilicate ferric magnesium is added into the wastewater for a hybrid reaction of between 5 and 15 mins; allowing the wastewater to flow into a sedimentation basin for plain sedimentation of between 4 and 6 hrs; and extracting a supernatant liquor to yield a processed effluent.

10 Claims, 1 Drawing Sheet

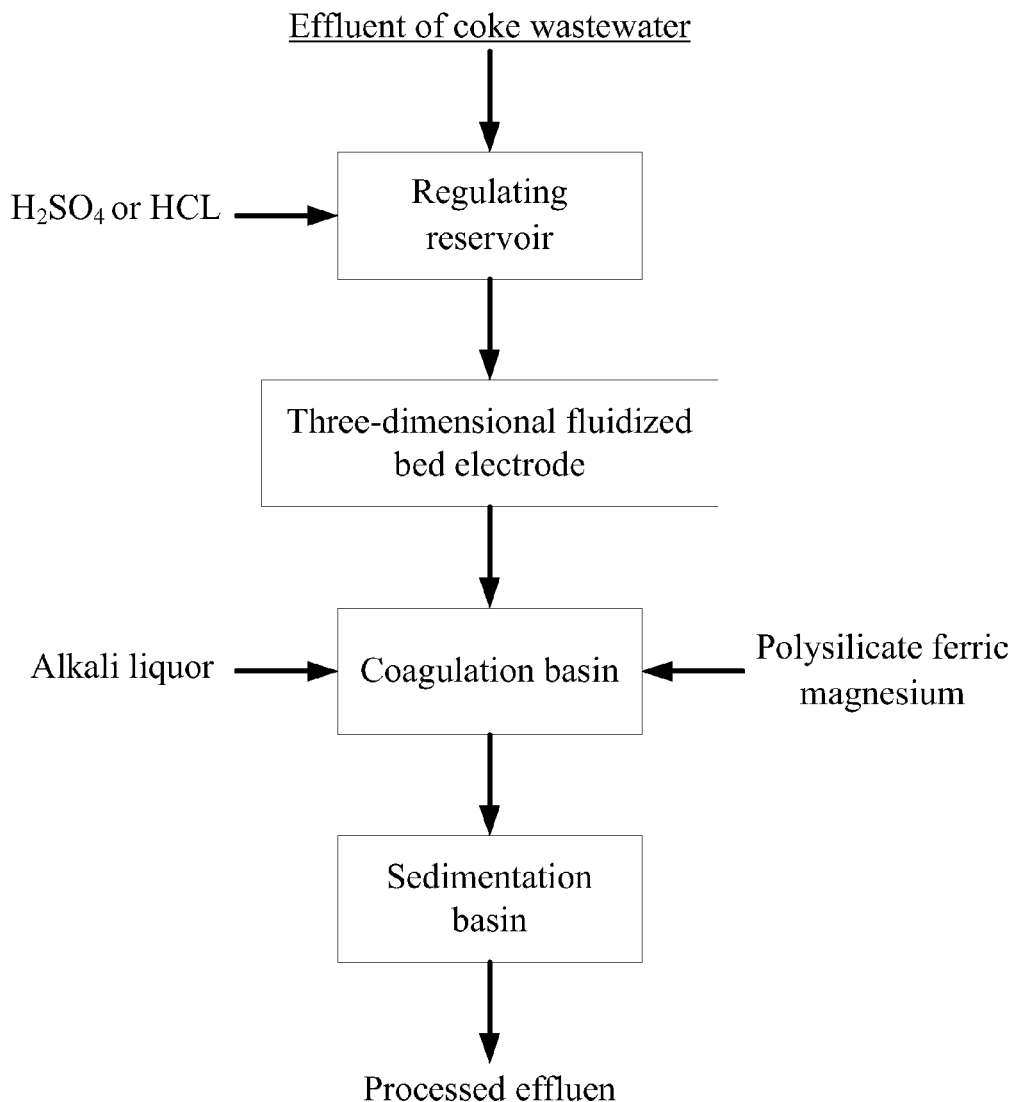

METHOD OF TREATMENT OF COKE WASTEWATER

CROSS-REFERENCE TO RELATED APPLICATIONS

This application is a continuation-in-part of International Patent Application No. PCT/CN2010/079890 with an international filing date of Dec. 16, 2010, designating the United States, now pending, and further claims priority benefits to Chinese Patent Application No. 201010109182.8 filed Feb. 11, 2010. The contents of all of the aforementioned applications, including any intervening amendments thereto, are incorporated herein by reference.

BACKGROUND OF THE INVENTION

1. Field of the Invention

The invention relates to a method for coke wastewater treatment and more particularly to a method for advanced treatment of coke wastewater by combination of a three-dimensional fluidized bed electrode and coagulation, which belongs to the category of wastewater treatment.

2. Description of the Related Art

Coke wastewater is organic industrial wastewater produced from the processes of high-temperature coal carbonization, coal gas purification, product recycling, tar and coarse benzene refining, etc. Coke wastewater contains high-concentration inorganic pollutants such as ammonia nitrogen, cyanide, thiocyanide, and sulphide, etc, and organic pollutants such as phenolic compounds, polycyclic aromatic hydrocarbons (PAHs), heterocyclic compounds containing nitrogen, oxygen and sulfur, and aliphatic compounds. Wastewater has a complicated composition and is related to coking coal quality, carbonization temperature, and recovery processes and methods of coking products. At present, to dispose coke wastewater, most coking related enterprises first conduct pretreatment of oil removal-dephenolization-ammonia evaporation, and then a secondary biochemical treatment. The main processes include: conventional activated sludge process, anaerobic process-anoxic process-aerobic process ($A_1$-$A_2$-O), anoxic process-aerobic process (A-O), and anoxic process-primary aerobic process-secondary aerobic process (A-$O_1$-$O_2$). After the secondary biochemical treatment, emission standards can be achieved for phenol, cyanogens, and $BOD_5$ in the effluent. However, due to the existence of nondegradable organic substances, the emission standards cannot be achieved for COD (chemical oxygen demand), ammonia nitrogen, and chroma in the effluent. Therefore, coke wastewater is required for advanced treatment.

At present, methods for advanced treatment of coke wastewater are diversified, including biofilm process, coagulation process, adsorption method, and advanced oxidation process such as Fenton reagent oxidation method, ozone oxidation method, photocatalytic oxidation method, electrochemical oxidation method, catalytic wet oxidation method, etc. Effluent of coke wastewater contains a majority of nondegradable organic substances. When a biofilm process is adopted for advanced treatment, the microbial growth will become difficult, treatment efficiency will become low and frequent backwash of packing materials are required. Although a coagulation method is widely used, organic substances contained in the effluent of coke wastewater have a strong polarity and conventional coagulant is unsatisfactory in treatment effect, thus the emission standards cannot be achieved. Active carbon, as an adsorbent, is applied to advanced treatment of coke wastewater in practical projects. However, since active carbon is high in costs, difficult in regeneration, and high in operating costs, it is not widely used in reality. Although advanced oxidation process has excellent treatment effects, it is currently still focused on laboratory research stage and the operating costs are high. Therefore, advanced oxidation process is far from application on practical projects.

A conventional method for treatment of coke wastewater is described below. First, coke wastewater is disposed by flocculation of polysilicate aluminum ferric sulfate (PSAFS) containing boron (PFASSB), and then the coke wastewater is disposed by coal ash-lime for advanced adsorption treatment. After the treatment, COD contained in effluent reaches primary emission standard, and ammonia nitrogen reaches secondary emission standard. Adoption of coal ash as an adsorbent is low in costs, but poor in adsorption capacity, and has the disadvantage of being required for frequent replacement; meanwhile, aluminum contained in the flocculant causes secondary pollution to the environment.

Another method in the prior art for advanced treatment of coke wastewater adopts a bipolar three-dimensional electrode, in which COD ranges from 150 mg/L to 200 mg/L. When a cylindrical graphite is used as the anode, an iron rod as the cathode, a cell voltage 10 V, reaction time for 60 mins, pH value 8, activated carbon 115 g/L, and a liquid catalyst (including $Fe^{2+}$) 150 mg/L, the removal rate of COD can reach 70%. However, high polymer produced from the liquid catalyst can wrap up activated carbon particles, influences suspension property of activated carbon and sharply reduces adsorption sites on the surface of the activated carbon. Therefore, the activated carbon has the disadvantages of easily losing efficacy and demanding for frequent replacement, which affects stable operation of the device and results in rise of treatment costs.

The above two advanced treatment techniques for coke wastewater can only reduce pollutants such as COD, COD, and ammonia nitrogen, etc, but unknown to other water quality indexes such as removal of chroma. Overproof chroma is a common problem in coke wastewater treatment, and another tough problem is chroma. After biological treatment of the coke wastewater, although the pollutant concentration is reduced, some new organic substances are produced containing chromophores such as —CH=CH—, —CHO—, —COOH, —$NO_2$, and —$CNH_2O$, and auxochrome groups such as —$CH_3$, —SH, —OR, —NHR, —$NR_2$, —$NH_2$, etc. And the organic substances containing the chromophore have a stronger polarity, enabling some long-chain hydrocarbon emulsified and dispersed in wastewater. A single treatment technique is difficult to reach a standard in terms of a plurality of water quality indexes for stable treatment of wastewater. However, in reality, treatment technique is required with obvious treatment effect on pollutants contained in wastewater, with stable and reliable process.

SUMMARY OF THE INVENTION

In view of the above-described problems, it is one objective of the invention to provide an advanced treatment method for coke wastewater by the combination of three-dimensional electrode and coagulation. After the treatment using the method of the invention, primary effluent standard specified in Comprehensive Sewage Discharge Standard (GB9878-1996) is achieved for COD, ammonia nitrogen and chroma of effluent, and environmental pollution is reduced.

To achieve the above objective, in accordance with one embodiment of the invention, there is provided a method for coke wastewater comprising the following steps:

(1) Introducing wastewater into a regulating reservoir into which an acid liquor is added until the pH value of the wastewater ranges from 5.5 to 6.5;

(2) Introducing the wastewater treated in the step (1) into a three-dimensional electrode treatment device for electrolysis treatment, an electric current density therein ranging from 30 A/m$^2$ to 150 A/m$^2$ and electrolysis time ranging from 10 to 50 mins; and (3) Introducing the wastewater treated in the step (2) into a coagulation reaction tank into which an alkali liquor is added until the pH value of the wastewater ranges from 8 to 10, and as a coagulant polysilicate ferric magnesium is added into the wastewater for a hybrid reaction of 5-15 mins; allowing the wastewater to flow into a sedimentation basin for plain sedimentation of 4-6 hrs; and extracting a supernatant liquor to yield a processed effluent.

In a class of this embodiment, the acid liquor added in the wastewater described in the step (1) is sulfuric acid ($H_2SO_4$) or hydrochloric acid (HCL); waste sulfuric acid or waste hydrochloric acid can be used in order to save costs.

In a class of this embodiment, the three-dimensional electrode treatment device used in the step (2) is a three-dimensional fluidized bed electrode, and both a reactor pole plate and a filler particle electrode thereof are arranged on the upper surface of an air distributing plate; a lower side of the air distributing plate is provided with an air inlet taking in compressed air; both anode and cathode of the pole plate are made from high purity graphite or stainless steel; and a particle electrode used therein is made from activated carbon particles with a particle size at 2-5 mm and filling amount 50-120 g/L.

In the process of treating the effluent after biological treatment, material concentration and diffusion rate are the main limiting factors in the electrolytic reaction; introduction of air improves internal turbulence extent of the three-dimensional fluidized bed electrode reactor; conductive particles are in a fluidized state, and thus mass transfer efficiency of the reactor is strengthened, as well as potential distribution of solution in the reactor is relatively uniform; oxygen contained in the air can be transformed into strong oxidizers such as $H_2O_2$ and .OH after electron is trapped on the surface of electrode particles or the cathode; under the action of the strong oxidizers upon organic substances, oxidizing reaction and free radical chain reaction occur, which breaks the structures of organic substances, modifies the surfaces of organic substances, and enhances degradation of organic substances and post-treatment effect.

In a class of this embodiment, the coagulant of polysilicate ferric magnesium used in the step (3) is made from industrial water glass in which content of $SiO_2$ ranges from 2%-4%; sulfuric acid is added until the pH value of the industrial water glass ranges from 4.5 to 5.5; after activation for 30 mins under a constant temperature ranging from 45° C. to 50° C., quantitative ferric salt and magnesium salt are added, molar ratio of Si/(Fe+Mg) ranges from 0.5 to 1.5, and a molar ratio of Fe/Mg ranges from 0.5 to 2, it is stirred until full dissolution and cured for 2 hours. Electrolysis effluent is added with sodium hydroxide or lime milk until the pH value of wastewater ranges from 8 to 10; 2-6 mL polysilicate ferric magnesium is added into 1 L wastewater, after a hybrid reaction for 5-15 mins, wastewater flows into a sedimentation basin for plain sedimentation of 4-6 hrs; after the supernatant liquor is extracted, the processed effluent is obtained.

Due to branched-chain, annular, or nettystereochemical structure formed by polymerizing toward every direction, polysilicic acid has strong adhesive ability and adsorption bridging function. When used for coagulation, ferric salt, besides charge neutrality and compression of double charged, can also have complexation with perssads containing lone pair electrons in organic substances such as —$NH_2$, —$NR_2$, —OH, etc, changing the dissoluvability of organic substances. Magnesium ion has strong affinity to —COOH, —$SO_3$, —OH, etc. Under alkali condition, chemical coagulation is formed and decoloration is realized.

Advantages of the invention are summarized below:

The invention provides a method for advanced treatment of coke wastewater by the combination of three-dimensional electrode and coagulation. Based on the characteristics that effluent produced from coke wastewater is high in chroma, rich in polar organics, good in mass transfer efficiency of coupling three-dimensional fluidized bed electrode, high in current efficiency and remarkable in decoloration effect of polysilicate ferric magnesium, the problem that single process treatment is difficult in allowing effluent come up to standard in terms of a plurality of water quality indexes is solved, advanced treatment of coke wastewater can be efficiently, quickly and stably conducted, with COD, ammonia nitrogen and chroma of effluent up to standard of primary effluent standard specified in Comprehensive Sewage Discharge Standard (GB8978-96). The invention is characterized by remarkable process treatment, simple and convenient management, low operating costs and convenient engineering popularization.

BRIEF DESCRIPTION OF THE DRAWINGS

The invention is described hereinbelow with reference to accompanying drawings, in which the sole FIGURE is a process flow diagram of a method for treatment of coke wastewater in accordance with one embodiment of the invention.

DETAILED DESCRIPTION OF THE EMBODIMENTS

EXAMPLE 1

Preparation of a Coagulant of Polysilicate Ferric Magnesium

Polysilicate ferric magnesium is made from industrial water glass in which the content of $SiO_2$ is 2.5%; sulfuric acid is added until the pH value of the industrial water glass is 5.2; after activation for 30 mins under a constant temperature of 45° C., quantitative ferric sulfate and magnesium chloride are added, molar ratio of Si/(Fe+Mg) is 0.7, and molar ratio of Fe/Mg is 2.0, then it is stirred until full dissolution and cured for 2 hours; in this way, polysilicate ferric magnesium can be obtained.

Wastewater not up to standard is disposed by a coking plant with a biochemical treatment process, COD ranging from 128 mg/L to 165 mg/L, ammonia nitrogen ranging from 19 mg/L to 32 mg/L, and chroma being 150 times; effluent which has been through biochemical treatment is led to a regulating reservoir into which sulfuric acid ($H_2SO_4$) solution is added until the pH value of wastewater is 5.5; then wastewater is led to a self-made three-dimensional fluidized bed electrode reactor; both anode and cathode of the pole plate are made from high purity graphite; and the particle electrode is made from activated carbon, with a particle size at 2-4 mm and filling amount 50 g/L; compressed air is introduced; electric current density is 30 A/m$^2$, and electrolysis time is 20 mins; wastewater disposed by electrolytic treatment is led to a coagulation basin into which an alkali liquor is added until the pH value of wastewater reaches 8, and 4 mL polysilicate ferric magnesium is added into 1 L wastewater for a hybrid reaction of 5 mins; then wastewater flows into a sedimentation basin for plain sedimentation of 4 hrs; after supernatant liquor is extracted, the processed effluent is obtained.

After the above process treatment, in terms of COD, ammonia nitrogen, and chroma, effluent comes up to standard of primary effluent standard specified in Comprehensive Sewage Discharge Standard (GB8978-96).

EXAMPLE 2

Preparation of a Coagulant of Polysilicate Ferric Magnesium

Polysilicate ferric magnesium is made from industrial water glass in which the content of $SiO_2$ is 3%; sulfuric acid is added until the pH value of the industrial water glass is 5; after activation for 30 mins under a constant temperature of 50° C., quantitative ferric sulfate and magnesium sulfate are added, molar ratio of Si/(Fe+Mg) is 0.5, and molar ratio of Fe/Mg is 1, then it is stirred until full dissolution and cured for 2 hours; in this way, polysilicate ferric magnesium can be obtained.

Wastewater not up to standard is disposed by a coking plant with a biochemical treatment process, COD ranging from 210 mg/L to 305 mg/L, ammonia nitrogen ranging from 30 mg/L to 50 mg/L, and chroma being 300 times; effluent which has been through biochemical treatment is led to a regulating reservoir into which hydrochloric acid (HCL) solution is added until the pH value of wastewater is 6; then wastewater is led to a self-made three-dimensional fluidized bed electrode reactor; and anode of the pole plate is made from stainless steel; and cathode of the pole plate is made from high purity graphite; and the particle electrode is made from activated carbon, with a particle size at 2-4 mm and filling amount 100 g/L; compressed air is introduced; electric current density is 120 $A/m^2$, and electrolysis time is 35 mins; wastewater disposed by electrolytic treatment is led to a coagulation basin into which an alkali liquor is added until the pH value of wastewater reaches 9.5, and 2 mL polysilicate ferric magnesium is added into 1 L wastewater for a hybrid reaction of 10 mins; then wastewater flows into a sedimentation basin for plain sedimentation of 5 hrs; after supernatant liquor is extracted, the processed effluent is obtained.

After the above process treatment, in terms of COD, ammonia nitrogen and chroma, effluent comes up to standard of primary effluent standard specified in Comprehensive Sewage Discharge Standard (GB8978-96).

EXAMPLE 3

Preparation of a Coagulant of Polysilicate Ferric Magnesium

Polysilicate ferric magnesium is made from industrial water glass in which the content of $SiO_2$ is 4%; sulfuric acid is added until the pH value of the industrial water glass is 4.8; after activation for 30 mins under a constant temperature of 45° C., quantitative ferric chloride and magnesium sulfate are added, molar ratio of Si/(Fe+Mg) is 1.2, and molar ratio of Fe/Mg is 0.8, then it is stirred until full dissolution and cured for 2 hours; in this way, polysilicate ferric magnesium can be obtained.

Wastewater not up to standard is disposed by a coking plant with a biochemical treatment process, COD ranging from 180 mg/L to 272 mg/L, ammonia nitrogen ranging from 12 mg/L to 28 mg/L, and chroma being 320 times; effluent which has been through biochemical treatment is led to a regulating reservoir into which sulfuric acid ($H_2SO_4$) solution is added until the pH value of wastewater is 6; then wastewater is led to a self-made three-dimensional fluidized bed electrode reactor; and anode of the pole plate is made from stainless steel; and cathode of the pole plate is made from high purity graphite; and the particle electrode is made from activated carbon, with a particle size at 2-3 mm and filling amount 80 g/L; compressed air is introduced; electric current density is 100 $A/m^2$, and electrolysis time is 10 mins; wastewater disposed by electrolytic treatment is led to a coagulation basin into which alkali liquor is added until the pH value of wastewater reaches 10, and 5 mL polysilicate ferric magnesium is added into 1 L wastewater for a hybrid reaction of 10 mins; then wastewater flows into a sedimentation basin for plain sedimentation of 4 hrs; after supernatant liquor is extracted, the processed effluent is obtained.

After the above process treatment, in terms of COD, ammonia nitrogen and chroma, effluent comes up to standard of primary effluent standard specified in Comprehensive Sewage Discharge Standard (GB8978-96).

EXAMPLE 4

Preparation of a Coagulant of Polysilicate Ferric Magnesium

Polysilicate ferric magnesium is made from industrial water glass in which the content of $SiO_2$ is 2%; sulfuric acid is added until the pH value of the industrial water glass is 4.5; after activation for 30 mins under a constant temperature of 45° C., quantitative ferric sulfate and magnesium chloride are added, molar ratio of Si/(Fe+Mg) is 0.8, and molar ratio of Fe/Mg is 0.5, then it is stirred until full dissolution and cured for 2 hours; in this way, polysilicate ferric magnesium can be obtained.

Wastewater not up to standard is disposed by a coking plant with a biochemical treatment process, COD ranging from 260 mg/L to 380 mg/L, ammonia nitrogen ranging from 25 mg/L to 42 mg/L, and chroma being 500 times; effluent which has been through biochemical treatment is led to a regulating reservoir into which waste hydrochloric acid (HCL) solution is added until the pH value of wastewater is 5.5; then wastewater is led to a self-made three-dimensional fluidized bed electrode reactor; both anode and cathode of the pole plate are made from stainless steel; and the particle electrode is made from activated carbon, with particle size at 2-4 mm and filling amount 120 g/L; compressed air is introduced; electric current density is 150 $A/m^2$, and electrolysis time is 50 mins; wastewater disposed by electrolytic treatment is led to a coagulation basin into which alkali liquor is added until the pH value of wastewater reaches 10, and 6 mL polysilicate ferric magnesium is added into 1 L wastewater for a hybrid reaction of 15 mins; then wastewater flows into a sedimentation basin for plain sedimentation of 6 hrs; after supernatant liquor is extracted, the processed effluent is obtained.

After the above process treatment, in terms of COD, ammonia nitrogen and chroma, effluent comes up to standard of primary effluent standard specified in Comprehensive Sewage Discharge Standard (GB8978-96).

EXAMPLE 5

Preparation of a Coagulant of Polysilicate Ferric Magnesium

Polysilicate ferric magnesium is made from industrial water glass in which the content of $SiO_2$ is 3.5%; sulfuric acid is added until the pH value of the industrial water glass is 5.5; after activation for 30 mins under a constant temperature of 50° C., quantitative ferric chloride and magnesium chloride are added, molar ratio of Si/(Fe+Mg) is 1.5, and molar ratio of Fe/Mg is 1.5, then it is stirred until full dissolution and cured for 2 hours; in this way, polysilicate ferric magnesium can be obtained.

Wastewater not up to standard is disposed by a coking plant with a biochemical treatment process, COD ranging from 135 mg/L to 197 mg/L, ammonia nitrogen ranging from 12 mg/L to 27 mg/L, and chroma being 150 times; effluent which has been through biochemical treatment is led to a regulating reservoir into which hydrochloric acid (HCL) solution is added until the pH value of wastewater is 6; then wastewater is led to a self-made three-dimensional fluidized bed electrode reactor; and anode of the pole plate is made from high purity graphite; and cathode of the pole plate is made from stainless steel; and the particle electrode is made from activated carbon, with particle size at 3-5 mm and filling amount 70 g/L; compressed air is introduced; electric current density is 70 A/m$^2$, and electrolysis time is 40 mins; wastewater disposed by electrolytic treatment is led to a coagulation basin into which alkali liquor is added until the pH value of wastewater reaches 9, and 4 mL polysilicate ferric magnesium is added into 1 L wastewater for a hybrid reaction of 10 mins; then wastewater flows into a sedimentation basin for plain sedimentation of 4 hrs; after supernatant liquor is extracted, the processed effluent is obtained.

After the above process treatment, in terms of COD, ammonia nitrogen and chroma, effluent comes up to standard of primary effluent standard specified in Comprehensive Sewage Discharge Standard (GB8978-96).

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for treating wastewater, the wastewater comprising non-degradable organics, the method comprising the following steps:
   (1) introducing the wastewater into a regulating reservoir and adding an acid into the regulating reservoir until the pH value of the wastewater ranges from 5.5 to 6.5;
   (2) introducing the wastewater treated in the step (1) into an electrode treatment device for electrolysis treatment, an electric current density therein ranging from 30 A/m$^2$ to 150 A/m$^2$ and electrolysis time ranging from 10 to 50 mins, wherein the electrode treatment device comprises a fluidized bed electrode comprising a reactor pole plate and a filler particle electrode, the reactor pole plate comprises an anode and a cathode, and the anode comprises stainless steel; and
   (3) introducing the wastewater treated in the step (2) into a coagulation reaction tank, adding an alkali into the coagulation reaction tank until the pH value of the wastewater ranges from 8 to 10, and adding polysilicate ferric magnesium into the wastewater for a hybrid reaction for 5-15 mins; allowing the wastewater to flow into a sedimentation basin for plain sedimentation for 4-6 hours; and extracting a supernatant from the wastewater.

2. The method of claim 1, wherein the acid added in the wastewater described in the step (1) is sulfuric acid, hydrochloric acid, waste sulfuric acid, or waste hydrochloric acid.

3. The method of claim 1, wherein the electrode treatment device used in the step (2) comprises an air distributing plate, both the reactor pole plate and the filler particle electrode are arranged on the upper surface of the air distributing plate; and a lower side of the air distributing plate is provided with an air inlet.

4. The method of claim 3, wherein the cathode of the reactor pole plate comprises high purity graphite or stainless steel.

5. The method of claim 3, wherein the filler particle electrode used in the step (2) comprises activated carbon particles with a particle size at 2-5 mm and filling amount 50-120 g/L.

6. The method of claim 4, wherein the filler particle electrode used in the step (2) comprises activated carbon particles with a particle size at 2-5 mm and filling amount 50-120 g/L.

7. The method of claim 3, wherein:
   the polysilicate ferric magnesium used in the step (3) is made from industrial water glass in which content of SiO$_2$ ranges from 2%-4%;
   sulfuric acid is added until the pH value of the industrial water glass ranges from 4.5 to 5.5; and
   after activation for 30 mins under a constant temperature ranging from 45° C. to 50° C., 2-6 mL ferric salt and magnesium salt per liter of wastewater are added, stirred until full dissolution, and cured for 2 hours.

8. The method of claim 4, wherein:
   the polysilicate ferric magnesium used in the step (3) is made from industrial water glass in which content of SiO$_2$ ranges from 2%-4%;
   sulfuric acid is added until the pH value of the industrial water glass ranges from 4.5 to 5.5; and
   after activation for 30 mins under a constant temperature ranging from 45° C. to 50° C., 2-6 mL of a ferric salt and a magnesium salt per liter of wastewater are added, stirred until full dissolution, and cured for 2 hours.

9. The method of claim 7, wherein the iron salt is ferric chloride or ferric sulfate, and the magnesium salt is magnesium chloride or magnesium sulfate, a molar ratio of Si/(Fe+Mg) ranging from 0.5 to 1.5, and a molar ratio of Fe/Mg ranging from 0.5 to 2.

10. The method of claim 8, wherein the iron salt is ferric chloride or ferric sulfate, and the magnesium salt is magnesium chloride or magnesium sulfate, a molar ratio of Si/(Fe+Mg) ranging from 0.5 to 1.5, and a molar ratio of Fe/Mg ranging from 0.5 to 2.

* * * * *